United States Patent
Roskind

(12) 
(10) Patent No.: US 9,507,859 B1
(45) Date of Patent: Nov. 29, 2016

(54) SPECULATIVE ACQUISITION OF CERTIFICATE VALIDATION INFORMATION

(75) Inventor: James Roskind, Redwood City, CA (US)

(73) Assignee: GOOGLE INC., Mountain View, CA (US)

( * ) Notice: Subject to any disclaimer, the term of this patent is extended or adjusted under 35 U.S.C. 154(b) by 276 days.

(21) Appl. No.: 13/075,687

(22) Filed: Mar. 30, 2011

(51) Int. Cl.
*G06F 17/30* (2006.01)

(52) U.S. Cl.
CPC .............................. *G06F 17/30737* (2013.01)

(58) Field of Classification Search
USPC ................ 707/608, 687, 705, 790, 813, 821
See application file for complete search history.

(56) References Cited

U.S. PATENT DOCUMENTS

| | | | |
|---|---|---|---|
| 7,865,721 B2 * | 1/2011 | Yellepeddy | 713/158 |
| 8,295,492 B2 * | 10/2012 | Suarez | G06F 21/33 380/286 |
| 8,301,878 B2 * | 10/2012 | Brown et al. | 713/156 |
| 2005/0193204 A1 | 9/2005 | Engberg et al. | |
| 2006/0047950 A1 * | 3/2006 | Thayer | H04L 9/3268 713/156 |
| 2006/0174323 A1 * | 8/2006 | Brown | H04L 63/0428 726/3 |
| 2008/0010448 A1 * | 1/2008 | Sabnis | H04L 9/3263 713/156 |
| 2008/0133906 A1 | 6/2008 | Parkinson et al. | |
| 2009/0319796 A1 * | 12/2009 | Kim et al. | 713/176 |

* cited by examiner

*Primary Examiner* — Sana Al Hashemi
(74) *Attorney, Agent, or Firm* — McDermott Will & Emery LLP

(57) ABSTRACT

Methods and systems for validating online certificate status are provided. A method for validating online certificate status may include storing data associated with a first certificate beyond an expiration time of a second certificate. The second certificate was used to validate the first certificate. The method may further include validating the first certificate upon a host connection request or prior to expiration of a second certificate. A system for validating online certificate status may include a certificate data acquirer and a certificate validator. Another method for validating online certificate status may include obtaining a hostname and selecting a first certificate based upon an association between the hostname and data associated with the first certificate. The method may also include providing the first certificate data for validation. A system for validating online certificate status may include a speculator. A system for providing an online certificate status may include a speculative server.

19 Claims, 7 Drawing Sheets

SPECULATIVE ACQUISITION OF CERTIFICATE VALIDATION INFORMATION

TECHNICAL FIELD

The field relates to the Internet, web browsers and web applications.

BACKGROUND

Certificates, such as public key and private key certificates, may be used to provide trusted Internet communications. However, certificates may expire or be revoked. Certain protocols, such as Online Certificate Status Protocol (OCSP) may be used to obtain certificate status information, such as whether a certificate is valid or if it has been revoked.

Establishing a Secure Socket Layer (SSL) connection and validating online certificates adds additional latency to establishing a connection. The standard approach is to use the OCSP as defined, wait for the information used to validate a certificate, and then validate it in real time. This requires information to be serially acquired, adding one to two roundtrips to establishing an SSL connection. These extra round trips incur additional latency, which may cause user discomfort.

BRIEF SUMMARY

The embodiments described below relate to systems and methods for validating online certificate status. According to an embodiment, a method for validating online certificate status may include storing data associated with a first certificate beyond an expiration time of a second certificate. The second certificate was used to validate the first certificate. The method may further include validating the first certificate. This may be performed upon a host connection request or prior to an expiration of the second certificate.

According to another embodiment, a system for validating online certificate status may include a certificate data acquirer configured to store data associated with a first certificate beyond an expiration time of a second certificate. The second certificate was used to validate the first certificate. The system may also include a certificate data validator configured to validate the certificate data.

According to an embodiment, a method for validating online certificate status may include obtaining a hostname. The method may also include selecting, in anticipation of a connection request for the hostname, a first certificate based upon an association between the hostname and data associated with the first certificate. The first certificate data may be stored beyond an expiration time of a second certificate. The second certificate was used to validate the first certificate. The method may also include providing the first certificate data for validation. The first certificate data may be used to obtain a current second certificate to validate the first certificate.

According to another embodiment, a system for validating online certificate data may include a speculator configured to obtain a hostname and select, in anticipation of a connection request for a hostname, a first certificate based upon an association between the hostname and data associated with the first certificate. The first certificate date may be stored beyond an expiration time of a second certificate. The second certificate was used to validate the first certificate. The speculator may also be configured to provide the first certificate data for validation. The first certificate data may be used to obtain a current second certificate to validate the first certificate.

According to an embodiment, a method for providing online certificate data may include obtaining, from an OCSP responder, a second certificate used to validate a first certificate associated with a hostname. The method may also include caching the second certificate. The method may further include providing the second certificate based on the hostname associated with the first certificate.

According to another embodiment, a system for providing online certificate data may include a certificate data cache configured to obtain, from an OCSP responder, a second certificate used to validate a first certificate associated with a hostname. The certificate data cache may also be configured to cache the second certificate. The system may further include a certificate data manager configured to provide the second certificate based on the hostname associated with the first certificate.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments described herein refer to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

Figure 1:
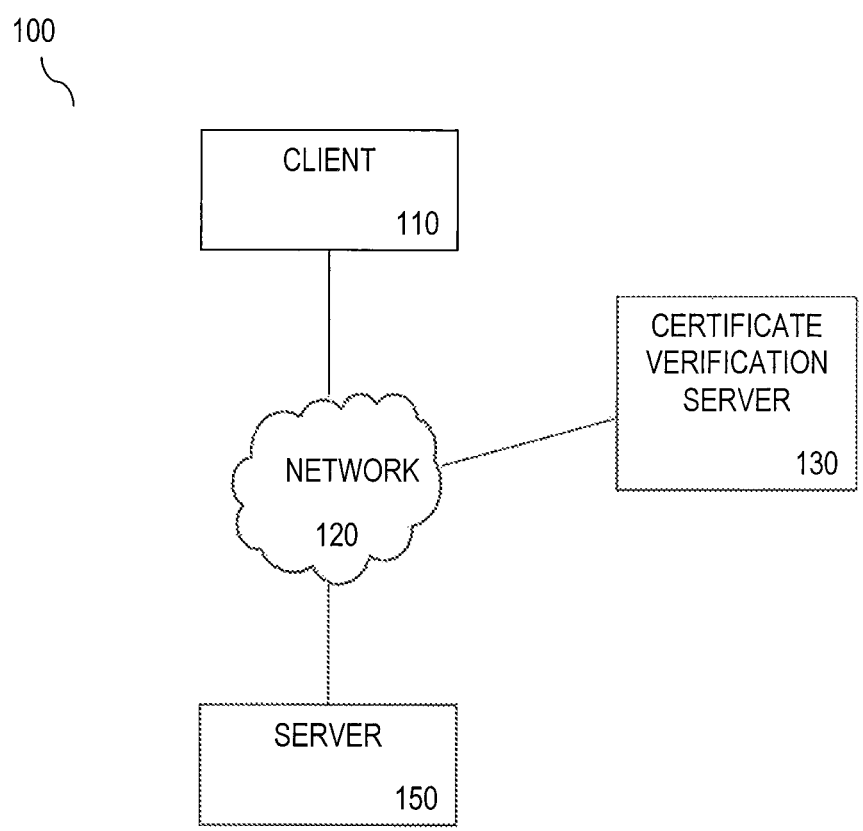
FIG. 1 illustrates an architecture diagram of a system for validating online certificate status according to an embodiment.

Online certificates may be used to provide a trusted connection between computers over the Internet. For example, FIG. 1 shows an example of a system 100 for establishing a trusted connection using online certificates. Client 110 may seek to form a secure connection with server 150 over network 120. Client 110 may have a first certificate, or public key certificate, signed by a third party such as a VeriSign® SSL certificate. Certificate verification server 130 may provide a second certificate, such as a revocation status certificate, that is used to verify public key certificates. Revocation status certificates may be provided by and verified by one or more parties. Public key certificates are replaced on a regular basis. Other certificates remain in use for extended periods of time. However, revocation status certificates may be replaced or renewed at a higher frequency.

Revocation status certificates are used in combination with public key certificates and need to be valid in order to validate the public key certificate. Certificate verification server 130 may provide validation information, or information whether a revocation status certificate is not valid or revoked. Certificates may be revoked if there has been a security breach or some other security issue. Revocation helps to prevent compromised certificates or fraudulent use of certificates. Some protocols, such as Online Certificate Status Protocol (OCSP), may be used to obtain first certificate status information, such as whether the first certificate has been revoked, or whether a revocation status certificate can attest to the current validity of the first certificate.

However, establishing a Secure Socket Layer (SSL) connection and validating online certificates adds additional latency to establishing a connection. The standard approach is to obtain a first certificate while starting to establish a connection, use the OCSP as defined, wait for the information needed to validate the first certificate, and then validate it in real time to allow the connection to be fully established. This requires information to be serially acquired, adding one to two roundtrips to establishing an SSL connection. For example, obtaining a first certificate may take 1-2 roundtrips, the SSL handshake 1-2 roundtrips, and obtaining an OCSP revocation answer 1-2 roundtrips. These multiple round trips incur additional latency, which may cause user discomfort. It is possible that "pinning" OCSP information to data exchanged during a handshake may reduce round-trip count, but this swells the content of the handshake.

In contrast, a speculative approach, as described herein, allows the acquisition and validation of a second certificate, or revocation status certificate, to take place in parallel with other portions of establishing a secure connection. This approach may use excess bandwidth that is available during the numerous connection forming round trips. The speculative approach can also work with older servers, that may not provide pinned augmentations. Also, OCSP data may sometimes be cached. Cached data, when acceptable, can remove the need to re-acquire the OCSP data. However, cached data is only available on repeat connections when a revocation status certificate has not yet expired or been evicted, and not on an initial connection after a more extended hiatus, whereas the speculative approach handles the initial connection after a hiatus, and is not limited by cache size and availability.

OCSP (Online Certificate Status Protocol) is currently used to check for revocation of an SSL certificate, such as when making an HTTPS request. The acquisition is usually made late in the connection process, after resolving a host name, making a TCP/IP connection, and performing the start of a handshake. Rather than waiting for all those events, according to an embodiment, a client may speculate on the need for information, and determine a first certificate with only the name of a host. The first certificate may be used to determine what OCSP information will be needed, and obtain it. Although the certificate data used for OCSP validation may be speculative, and may not always be correct, it is expected that this will usually reduce the latency of an SSL connection by roughly one to four round trips (the latency needed to contact a traditional OCSP server). In another embodiment, details of a certificate that had been previously used in a handshake may be provided, based on the speculation that the same certificate will soon need to be validated.

Figure 2:
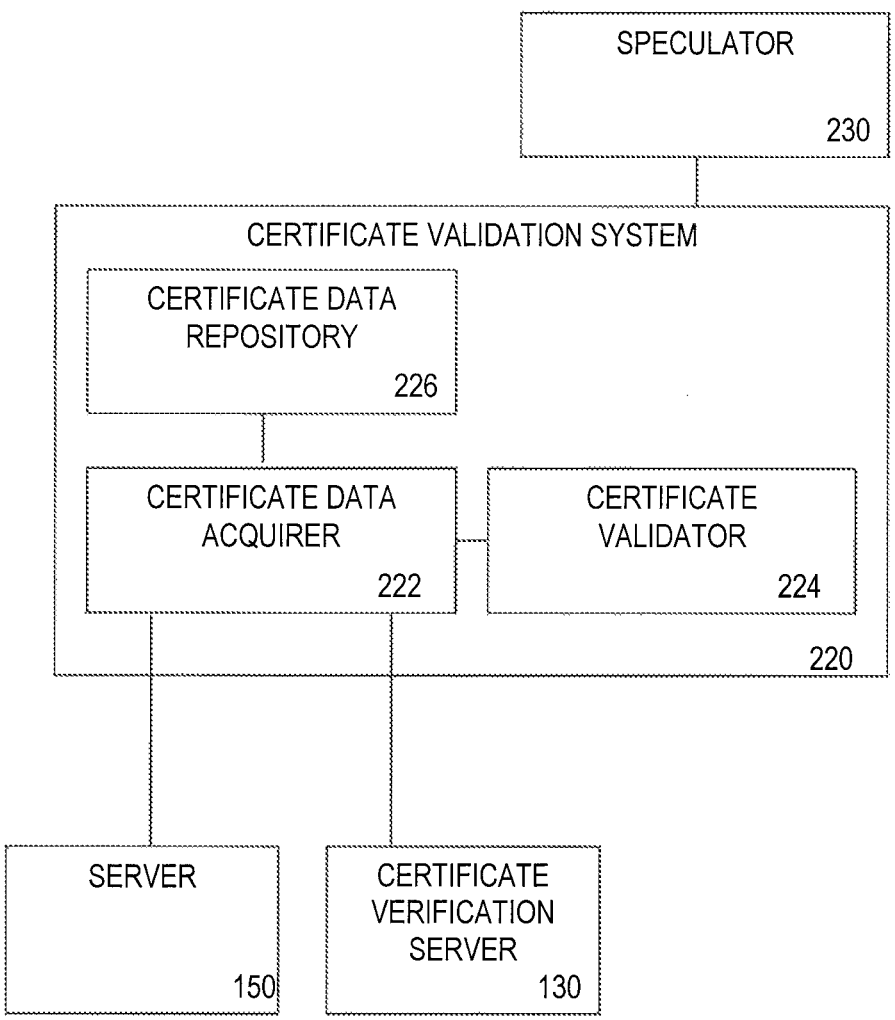
FIG. 2 illustrates a system for validating online certificate status according to an embodiment.

FIG. 2 is an architecture diagram of exemplary speculative certificate validation system 200, according to an embodiment. System 200, or any combination of its components, may be part of or may be implemented with one or more computing devices. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

According to an embodiment, system 200 may be coupled to or implemented within client 110, which is coupled to server 150 remotely over network 120. Client 110 may be implemented on one or more computing devices having one or more processors. System 200 and/or any of its components described below, such as certificate validation system 220 and speculator 230, may be implemented in software, firmware, hardware, or a combination thereof.

According to an embodiment, client 110 may be configured with system 200 for speculative acquisition of certificate validation information. As shown in FIG. 2, system 200 may include certificate data acquirer 212 and certificate validator 214. Certificate data acquirer 212 may be configured to acquire online certificates, certificate data or certificate validation information. Certificate validation information may include, for instance, OCSP data, the list of OCSP verified certificates, related certificate data and/or summary data. Certificate data and related validation information may be used for a given host and port connection, beyond an expiration of the certificate validation information. For example, if an SSL connection to mybank.com relied on certificate-1 and certificate-2, which in turn were verified by data ocsp-1 and ocsp-2 data, then a client may record the certificates, their fingerprints, the ocsp-n data, and/or information sufficient for acquiring ocsp-1 and ocsp-2. In that example, the acquired data may be stored beyond the expiration of ocsp-1 or ocsp-2. Certificates and certificate data may be received from server 150 or certificate verification server 130 and stored in certificate data repository 216.

According to an embodiment, certificate validator 214 may be configured to validate the certificate or certificate data. This may be performed upon a host connection request. In another embodiment, validation may be performed before expiration of the validation certificate or data, such as prior to a host request. Certificate validator 214 may obtain validation information from certificate verification server 130. In another example, certificate validator 214 may provide the first certificate data to an Online Certificate Status Protocol (OCSP) responder that returns a current second certificate associated with the first certificate. Certificate validator 214 may determine if the current second certificate has been revoked or expired. Certificate validator 214 may also validate the first certificate with the current second certificate.

According to a further embodiment, certificate data acquirer 212 may acquire and store certificates and certificate data from a server, such as server 150. For example, recorded responses from a server may be saved in certificate data repository 216 and used when OCSP validation is required. In some embodiments, a client may accumulate responses for more than one host and port, or for a plurality of certificate validations. In some embodiments, stored certificate data may be used in place of a certificate that a server may provide. In other embodiments, stored certificates may be used in place of a direct OCSP response, in order to validate one or more certificates.

In one embodiment, certificate data acquirer 212 may acquire potential certificates by making connections to an indicated host and optional port, and optionally contacting a related certificate verification server or revocation server, such as certificate verification server 130. For example, acquisition may be made prior to contacting a server and then recalled. Some acquisition of certificate data may also be made subsequent to contact and used. In some cases, acquisition of certificates may be made both before and after contact with a server. In these examples, a connection to a host and port may provide a list of certificates in need of validation. Certificate lists may be provided well ahead of time or on demand. Connecting to certificate verification server 130 may result in acquiring validation responses for the certificates.

Certificate data acquirer 212 may obtain speculative certificate validation information based on a predicted use of a certificate, according to an embodiment. Certificate data may be obtained from speculator 230. In some cases, speculator 230 may include a database that can respond to queries, such as queries about a host name and optional port.

Figure 3:
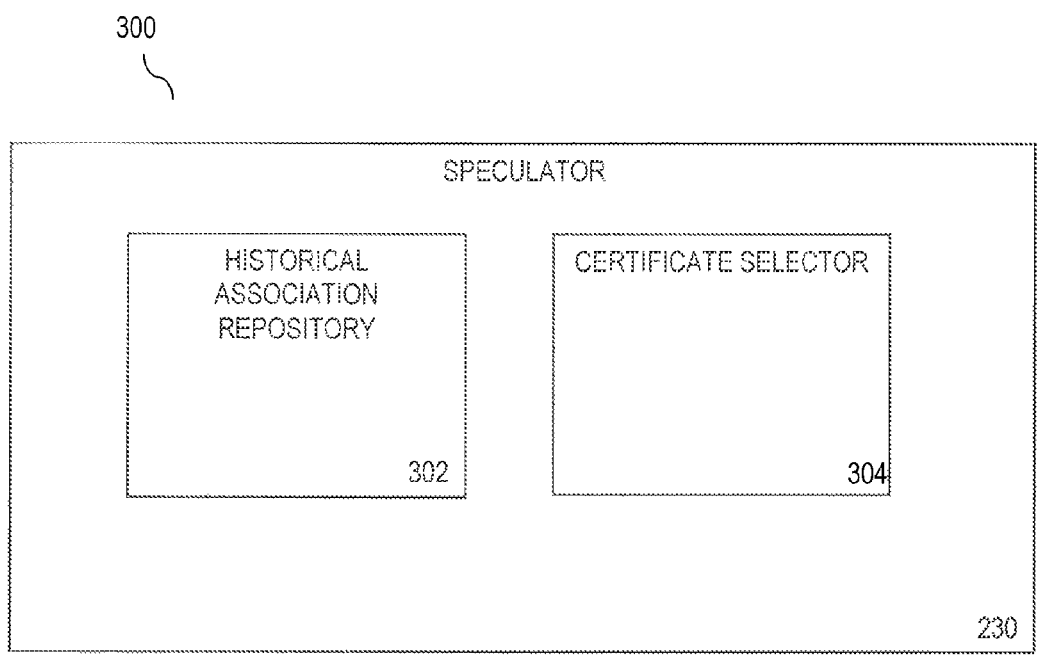
FIG. 3 further illustrates a system for validating online certificate status according to an embodiment.

FIG. 3 shows speculator 230, according to an embodiment. Speculator 230 may include historical association repository 302 and certificate selector 304. Historical association repository 302 may store historical associations between hostnames or websites and an associated certificate, or certificate data that corresponds to the associated certificate. For example, if a certificate was received and validated for an AMAZON.COM website, the first certificate or data associated with the certificate may be stored with an association to the AMAZON.COM website. If a user later navigates to the AMAZON.COM website, speculator 230 may speculate that the stored certificate data associated with the AMAZON.COM website may still be valid and certificate selector 304 may select the certificate or certificate data associated with the AMAZON.COM website based on the association stored in historical association repository 302. This certificate may be used to obtain a second certificate that is used to validate the first certificate. The second certificate may be a current second certificate. However, in some cases, the current second certificate may be the same as the original second certificate that was last used to validate the first certificate.

In another example, certificate selector 304 may use recorded information to obtain updated OCSP data that has an expiration date later than what was provided by a prior OCSP request. In an embodiment, certificate data acquirer 212 may proactively update certificate or OCSP data so that cached certificate verifications are available if a future connection needs such data for validation. For example, with this technique, OCSP data may be consistently refreshed so that cached responses are present beyond any fixed expiration time, assuming the certificates continue be validatable.

In some embodiments, certificate data acquirer 312 may supply data to speculator 230 for future use, such as certificate or OCSP data relating to connections to a given host and/or port. For example, after consummating an SSL connection, for which verification server 130 was contacted, a client may supply information including but not limited to a list of certificates used for the connection, and/or a list of OCSP data used to validate the certificates.

In some embodiments, data sent to speculator 230 may be sent only if a server, such as server 150, failed to provide such data during a prior client request. For example, if a connection to host 150 was made it provided no relevant data, or supplied insufficient data, such as omitting some or all OCSP data needed to validate connections, then afterward, a client may send data that would have been sufficient to the certificate data repository 216 or speculator 230. Speculator 230 may distribute such data for future client requests. In one example, the above process creates a distributed gathering system, acquiring OCSP data as SSL connections are made, uploading information to certificate data repository 216, and then redistributing it to the client or other clients that need the data, possibly with proactive requests to OCSP servers.

When an SSL client, such as a web browser, is about to make an SSL connection, such as during the fetch of content from an HTTPS universal resource locator (URL), the client may contact verification server 130 using certificate data acquirer 212, according to an embodiment. In an alternate embodiment, when an SSL client speculates that an SSL connection may be needed in the future, certificate data acquirer 212 may contact speculator 230 prior to contacting verification server 130.

Certificate validator 314 may be configured to initiate validation of the certificate data prior to initiation of a SSL handshake of the host connection request, according to an embodiment. For example, a client may update certificate data just in time, such as after a request for an SSL connection has been requested, but considerably before the SSL handshake elements have affirmed the necessity of validating a specific set of certificates. For example, if previous connections used certificate-1, then a client may speculate that certificate-1 will again be used, and may request an OCSP verification of certificate-1, and this may be performed before contacting the host/port and identifying what certificates will actually be used.

Figure 4:
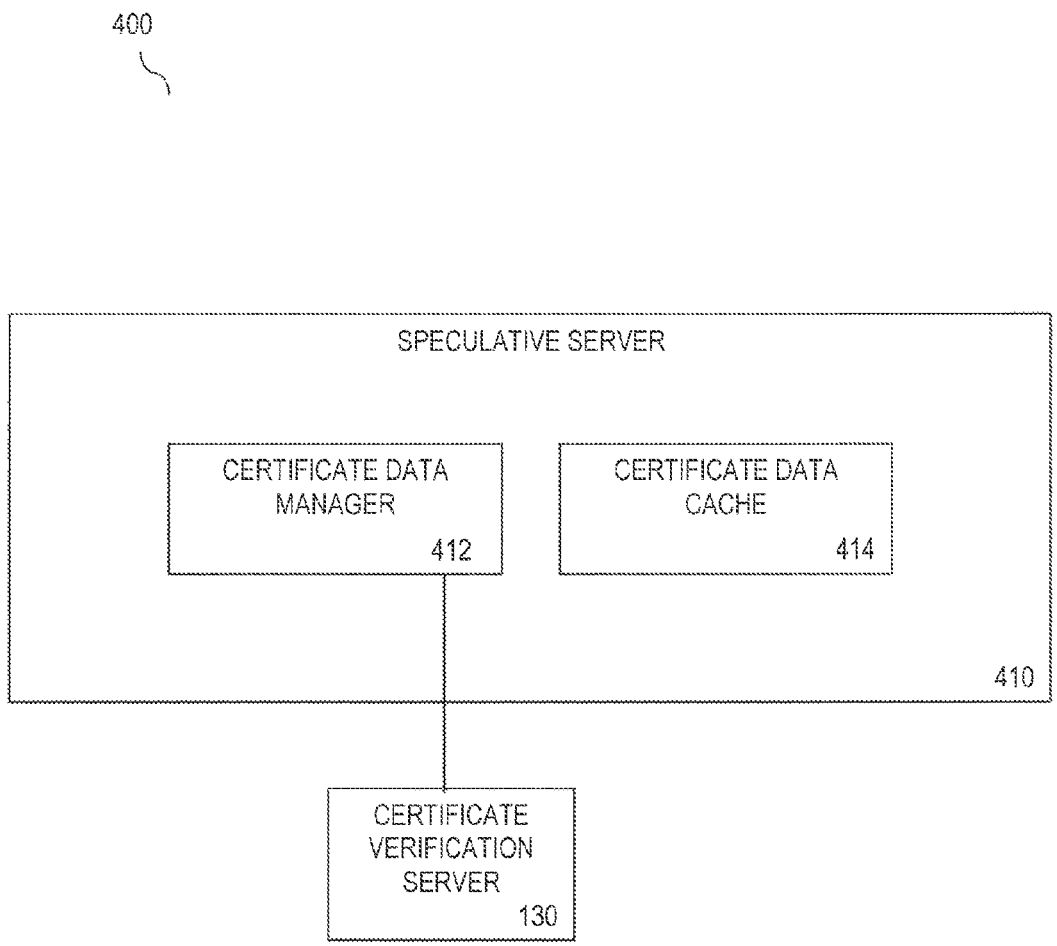
FIG. 4 illustrates a system for providing online certificate status according to an embodiment.

According to a further embodiment, a validation certificate, such as an OCSP certificate may be obtained from a speculative server. A speculative server may provide a second certificate, including OCSP data, used to validate a first certificate. A speculative server, such as speculative server 410 shown in FIG. 4, may provide certificate data in response to a hostname or first certificate data. In some cases, speculative server 410 may be located with client 110. In other cases, speculative server 410 may be a separate server, but not the ultimate OCSP responder, that obtains, caches and provides validation information to one or more clients.

According to an embodiment, speculative server 410 may be a "smart cache," which can be asked, and either answer with local information providing a second certificate, or forward the request to an OCSP server (because it cannot be answered locally). Certificate data manager 412 may receive requests and manage the acquisition of certificate data. Certificate data cache 414 may store validation information, OCSP data or second certificate data. For example, recorded responses from verification server 130 may be saved and used when OCSP validation is required. In some embodiments, a client may accumulate responses for more than one host and port, or for a plurality of certificate validations. In some embodiments, responses may be used in place of a direct OCSP response from an OCSP responder, in order to validate one or more certificates.

In one embodiment, speculative server 410 may obtain potential responses by making connections to an indicated host and optional port, and optionally contacting a related revocation server, OCSP responder, or certificate verification server, such as certificate verification server 130. For example, acquisition of OCSP response data or certificates may be made prior to contacting such a server and then recalled. Some acquisition of certificate data may also be made subsequent to the contact and used. In some cases, acquisition may be made both before and after contact with a certificate data server. In these examples, a connection to a host and port may provide a list of certificates in need of validation. Certificate lists may be provided well ahead of time or on demand. Speculative server 410 may obtain validation responses for the certificates.

Speculative server 410 may not only remember recent results, it may speculate, prior to an attempted navigation, and update itself autonomously by calling the true OCSP responder. For example, the speculative server may notice when one of those "second certificates" expires (or is nearing expiration), and contact an OCSP responder, such as verification server 130, to get an updated replacement second certificate that may not expire for a time. According to another embodiment, speculative server 410 may be a part of or coupled to speculator 230.

Figure 5:
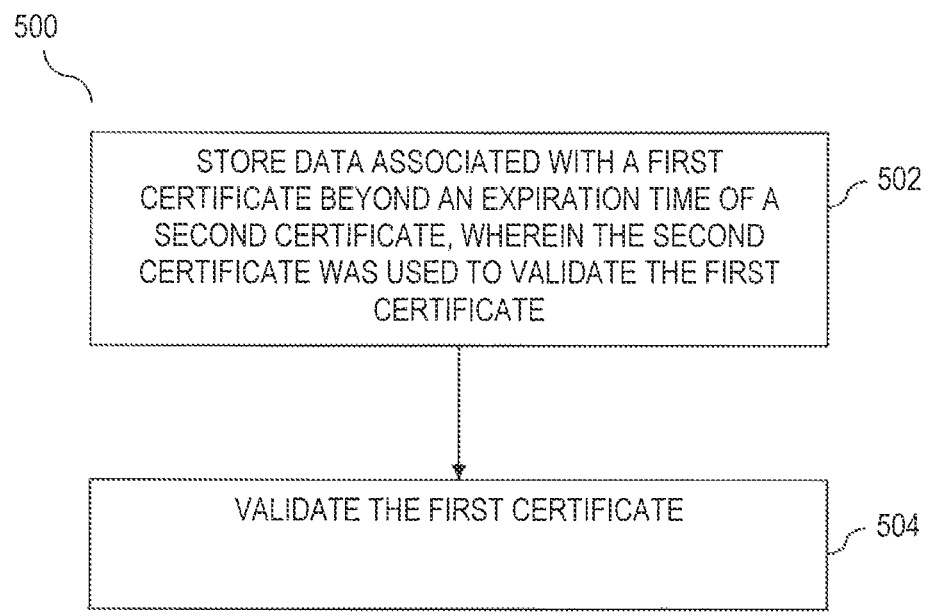
FIG. 5 is a flowchart illustrating a method for validating online certificate status according to an embodiment.

FIG. 5 is a flowchart of exemplary method 500 for validating online certificate status, according to an embodiment. While methods 500-700 are described with respect to an embodiment, methods 500-700 are not meant to be limiting and may be used in other applications. In an example, method 500 may be used to provide applications using system 200 of FIG. 2. However, method 500 is not meant to be limited to system 200.

As shown in FIG. 5, exemplary method 500 begins at step 502 where data associated with a first certificate is stored beyond an expiration time of a second certificate, wherein the second certificate was used to validate the first certificate. At step 504, the first certificate is validated. This may be performed upon a host connection request.

Validation may also be performed prior to an expiration of the second certificate. Validation of the first certificate may be speculatively renewed the validation when the second certificate is nearing expiration. Such action is not in response to a connection request, but is instead in response to an impending expiration. For example, if the second certificate has an expiration date of 7 days after acquisition, validation of the first certificate could be requested after 6 days and 23 hours, 59 minutes have passed. Using such a pro-active caching strategy, a validation may be obtained even before a re-connection request was made.

Steps 502 and 504 may be performed by certificate data acquirer 212 and certificate validator 514, respectively. It is possible that steps 502 and 504 may be performed in parallel with other steps for establishing a secure connection. In some cases, step 502 may be assisted by speculator 230.

Figure 6:
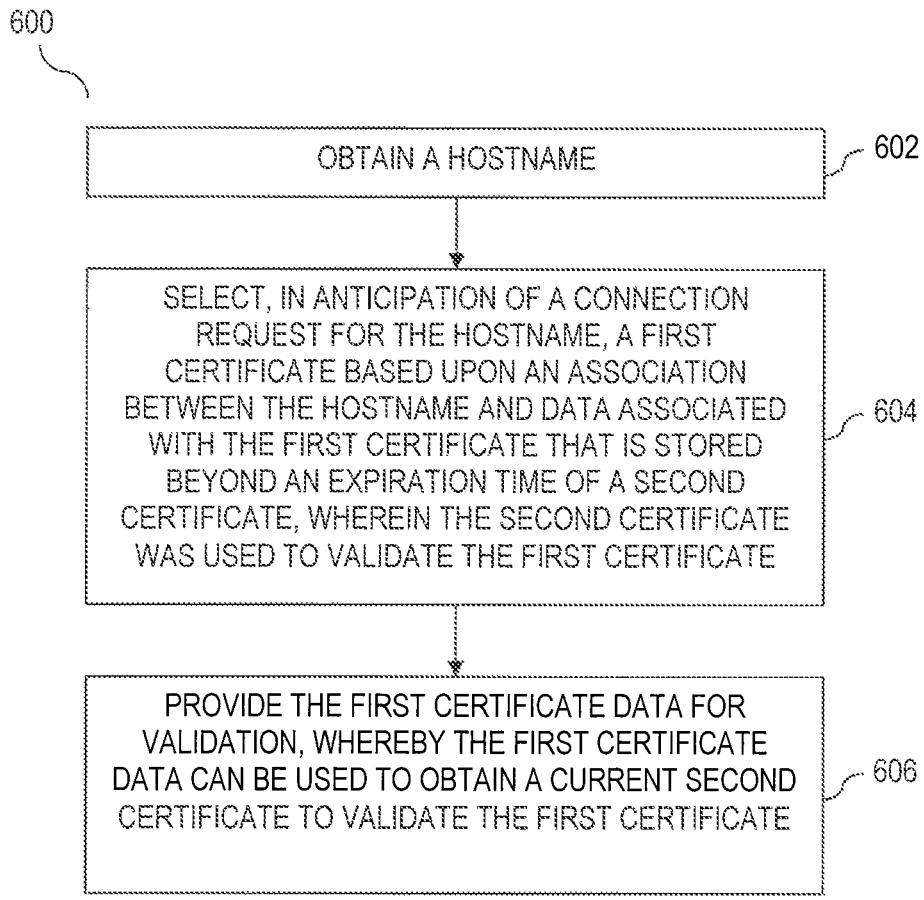
FIG. 6 is a flowchart illustrating another method for validating online certificate status according to an embodiment.

In some cases, certificate data may be provided by speculator 230. FIG. 6 shows an exemplary method 600 for validating online certificate status, according to an embodiment. Speculative certificate validation system 200 may have certificate data acquirer 212 contact speculator 230 to request certificate data by providing a host name and optionally port of a machine that may possibly accept an SSL connection. For example, the host name found in an HTTPS URL may be provided. A port may also be provided. In some cases, a default port, such as 443, may be provided. At step 602, a hostname is obtained by speculator 230.

At step 604, in anticipation of a connection request for the hostname, a first certificate may be selected based upon an association between the hostname and data associated with the first certificate. The first certificate data may be stored beyond an expiration time of a second certificate, wherein the second certificate was used to validate the first certificate.

Speculator 230 may respond with a certificate and data necessary to obtain certificate validation information, such as OCSP information. OCSP response information may include signed certificates attesting to the validity of a host certificate, such as host certificates that had previously been advertised by the host. In an embodiment, speculator 230 may respond to indicate that it has no OCSP information for the given host name and port. At step 606, the first certificate data may be provided for validation. This may be prior to or upon the connection request for the hostname, whereby the first certificate data can be used to obtain a current second certificate to validate the first certificate.

Figure 7:
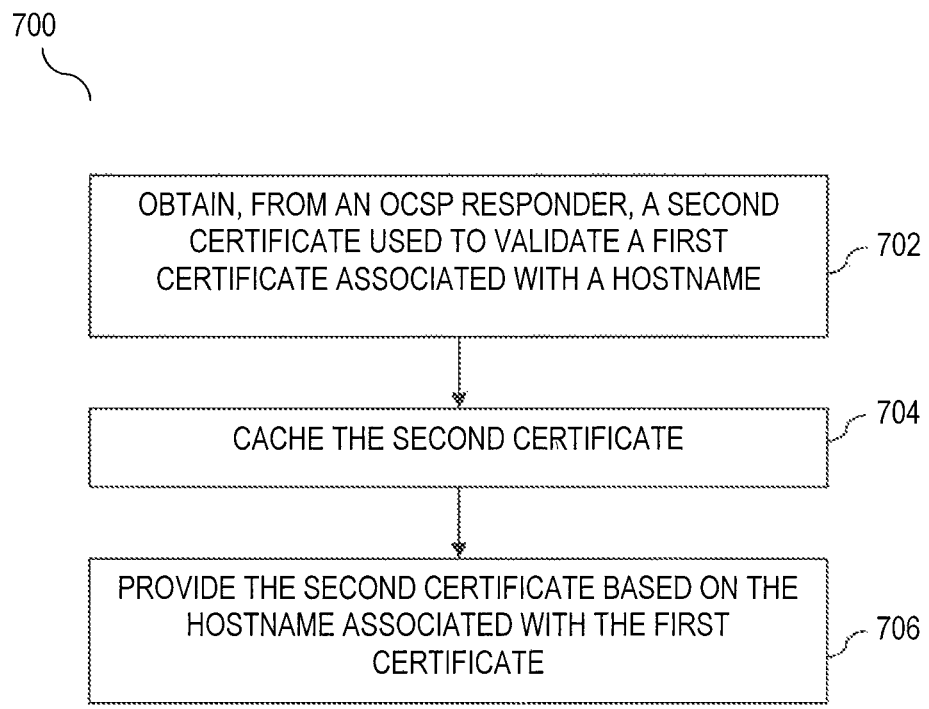
FIG. 7 is a flowchart illustrating a method for providing online certificate status according to an embodiment.

FIG. 7 shows an exemplary method 700, according to an embodiment, which illustrates the operation of a speculative server, such as speculative server 410. At step 702, a second certificate is obtained. The second certificate may be used to validate a first certificate associated with a hostname. This may be performed as part of a connection request for a hostname. Validation may also be performed prior to an expiration of the second certificate. For example, the second certificate may validate a first certificate at the beginning of a connection request or in parallel with other steps of the connection request because the second certificate was obtained earlier in the connection request. In a further example, certificate validation may take place in parallel with other steps associated with establishing a trusted SSL connection. This reduces latency. According to a further embodiment, the second certificate may be obtained in anticipation of a connection request for an associated hostname.

Aspects of the embodiments for exemplary systems 100-400 and/or methods 500-700 or any part(s) or function(s) thereof may be implemented using hardware, software modules, firmware, tangible computer readable or computer usable storage media having instructions stored thereon, or a combination thereof and may be implemented in one or more computer systems or other processing systems.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for validating online certificate status comprising:
   storing first certificate data associated with a first certificate beyond an expiration time of a second certificate and prior to receiving a request for a Secure Socket Layer (SSL) connection to a host identified by the request, wherein the first certificate is a public key certificate associated with the host and the second certificate was used to validate the first certificate;
   receiving the request for the SSL connection to the host identified by the request;
   selecting the first certificate for validation based upon an association between the first certificate data and the host identified by the request for SSL connection to the host;
   obtaining a current second certificate associated with the first certificate; and
   validating, with a computing device, the first certificate using the current second certificate in response to receiving the request for the SSL connection to the host, wherein the validating is initiated after the request for the SSL connection and prior to initiation of a SSL handshake of the SSL connection to the host and before the host identifies that the first certificate is to be used for the SSL handshake.

2. A system for validating online certificate status comprising:
   a certificate data acquirer configured to store first certificate data associated with a first certificate beyond an expiration time of a second certificate and prior to receiving a request for a Secure Socket Layer (SSL) connection to a host identified by the request, wherein the first certificate is a public key certificate associated with a host and the second certificate was used to validate the first certificate;
   a speculator configured to, upon receipt of the request for the SSL connection to the host identified by the request, select the first certificate for validation based upon the association between the first certificate data and the host identified by the request for SSL connection to the host;
   a certificate data acquirer configured to obtain a current second certificate associated with the first certificate; and
   a certificate validator, implemented with a computing device, configured to validate the first certificate data using the current second certificate in response to receiving the request for the SSL connection to the host, and to initiate validation of the first certificate data after the request for the SSL connection and prior to initiation of a SSL handshake of the SSL connection to the host and before the host identifies that the first certificate is to be used for the SSL handshake.

3. A computer-implemented method for validating online certificate status comprising:
   obtaining a hostname;
   selecting, in anticipation of a connection request for a Secure Socket Layer (SSL) connection to a host identified by the connection request and associated with the hostname, a first certificate based upon an association between the host identified by the request for SSL connection to the host and first certificate data associated with the first certificate that is stored beyond an expiration time of a second certificate, wherein the first certificate is a public key certificate and the second certificate was used to validate the first certificate;
   providing, with a computing device, the first certificate data for validation, wherein the first certificate data is used to obtain a current second certificate to validate the first certificate; and
   initiating validation of the first certificate using the second certificate, after the request for the SSL connection and prior to initiation of a SSL handshake of the SSL connection to the host and before the host identifies that the first certificate is to be used for the SSL handshake.

4. A system for validating online certificate status comprising:
   a speculator, implemented with a computing device, configured to:
      obtain a hostname;
      select, in anticipation of a connection request for a Secure Socket Layer (SSL) connection to a host identified by the connection request and associated with the hostname, a first certificate based upon an association between the host identified by the request for SSL connection to the host and first certificate data associated with the first certificate that is stored beyond an expiration time of a second certificate, wherein the first certificate is a public key certificate and the second certificate was used to validate the first certificate;
      provide the first certificate data for validation, wherein the first certificate data can be used to obtain a current second certificate to validate the first certificate; and
      initiate validation of the first certificate using the second certificate, after the request for the SSL connection and prior to initiation of a SSL handshake of the SSL connection to the host and before the host identifies that the first certificate is to be used for the SSL handshake.

5. A computer-implemented method for providing online certificate data comprising:
   obtaining, from an Online Certificate Status Protocol (OCSP) responder, a second certificate used to validate a first certificate associated with a host identified by a request for Secure Socket Layer (SSL) connection to the host, wherein validating of the first certificate is initiated after the request for the SSL connection and prior to initiation of an SSL handshake of the SSL connection to the host and before the host identifies that the first certificate is to be used for the SSL handshake, wherein the first certificate is a public key certificate;
   caching the second certificate; and
   providing, with a computing device, the second certificate based on the hostname associated with the first certificate.

6. A system for providing online certificate data comprising:
   a certificate data cache configured to:
      obtain, from an Online Certificate Status Protocol (OCSP) responder, a second certificate used to validate a first certificate associated with a host identified by a request for Secure Socket Layer (SSL) connection to the host, wherein validating of the first certificate is initiated after the request for the SSL connection and prior to initiation of a SSL handshake of a SSL connection to the host and before the host identifies that the first certificate is to be used for the SSL handshake, wherein the first certificate is a public key certificate;

cache the second certificate; and a certificate data manager, implemented with a computing device, configured to provide the second certificate based on the hostname associated with the first certificate.

7. The method of claim 1, wherein the validating is performed prior to expiration of the second certificate.

8. The method of claim 1, further comprising verifying the first certificate data prior to the request for the SSL connection to the host.

9. The method of claim 1, further comprising automatically updating the first certificate data with updated first certificate data having a later expiration time.

10. The method of claim 1, further comprising providing the first certificate data to an Online Certificate Status Protocol (OCSP) responder that returns the current second certificate associated with the first certificate.

11. The system of claim 2, wherein the certificate validator is further configured to validate the first certificate prior to expiration of the second certificate.

12. The system of claim 2, wherein the certificate validator is further configured to verify the first certificate data prior to the request for the SSL connection to the host.

13. The system of claim 2, wherein the certificate data acquirer is further configured to automatically update the first certificate data with updated first certificate data having a later expiration time.

14. The system of claim 2, wherein the certificate data acquirer is further configured to obtain the first certificate data associated with the hostname connection request from a speculator.

15. The system of claim 2, wherein the certificate validator is further configured to provide the first certificate data to an Online Certificate Status Protocol (OCSP) responder that returns the current second certificate associated with the first certificate.

16. The method of claim 5, further comprising automatically updating the cached second certificate with an updated second certificate having a later expiration time.

17. The system of claim 6, wherein the certificate data manager is further configured to automatically update the cached second certificate with an updated second certificate having a later expiration time.

18. The method of claim 10, wherein the validating further includes determining if the current second certificate has been revoked.

19. The system of claim 15, wherein the certificate validator is further configured to determine if the current second certificate has been revoked.

* * * * *